(12) United States Patent
Inami et al.

(10) Patent No.: US 11,701,748 B2
(45) Date of Patent: Jul. 18, 2023

(54) APPARATUS AND METHOD FOR CUTOFF MACHINING SINTERED MAGNET

(71) Applicant: Shin-Etsu Chemical Co., Ltd., Tokyo (JP)

(72) Inventors: Hitoshi Inami, Echizen (JP); Takafumi Ueno, Echizen (JP); Kazuhito Akada, Echizen (JP); Masaki Kasashima, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/510,756

(22) Filed: Oct. 26, 2021

(65) Prior Publication Data

US 2022/0063049 A1    Mar. 3, 2022

Related U.S. Application Data

(63) Continuation of application No. 15/980,013, filed on May 15, 2018, now Pat. No. 11,185,958.

(30) Foreign Application Priority Data

May 26, 2017 (JP) ................................. 2017-104336

(51) Int. Cl.
*B23D 47/04* (2006.01)
*B24B 27/06* (2006.01)
(Continued)

(52) U.S. Cl.
CPC ........ *B24B 27/0675* (2013.01); *B23D 47/047* (2013.01); *B24B 47/20* (2013.01); *B28D 1/04* (2013.01); *B28D 7/04* (2013.01)

(58) Field of Classification Search
CPC . B24B 27/0675; B24B 27/06; B24B 27/0625; B24B 27/0658; B24B 47/20;
(Continued)

(56) References Cited

U.S. PATENT DOCUMENTS 3,122,043 A * 2/1964 Shanok .................. B27B 5/228
                                                                83/411.6
3,394,743 A * 7/1968 Leu .......................... B27M 3/04
                                                                269/254 R
(Continued)

FOREIGN PATENT DOCUMENTS

CH     175598 A  *  3/1935  ............. B28B 1/048
CH     175598 A     3/1935
(Continued)

OTHER PUBLICATIONS

CH-175598—Machine Translation (Year: 1935).*
(Continued)

*Primary Examiner* — Monica S Carter
*Assistant Examiner* — Alberto Saenz
(74) *Attorney, Agent, or Firm* — WHDA, LLP (57) ABSTRACT

A sintered magnet sawing apparatus is provided comprising a cylindrical work carrier mounted on a horizontal rotating spindle and having a regular polygonal shape in a perpendicular cross section, and a plurality of endless elastic belts adapted to force a work of sintered magnet against the carrier surface to secure the work thereto and adapted to travel synchronously with and counter to the rotation of the carrier in a circulatory manner. In accordance with rotation of the carrier, the work is delivered to the peripheral surface of the carrier, secured thereto by the elastic belts, moved further forward and cutoff machined by an outer cutoff blade. The divided work is moved further forward, released and discharged from the carrier.

17 Claims, 10 Drawing Sheets

(51) Int. Cl.
  *B28D 1/04* (2006.01)
  *B28D 7/04* (2006.01)
  *B24B 47/20* (2006.01)

(58) Field of Classification Search
  CPC ..... B24B 41/005; B24B 41/06; B24B 41/067;
  B24B 55/02; B24B 5/313; B24B 5/32;
  B23D 47/047; B28D 1/04; B28D 7/02;
  B28D 7/04
  USPC .......................................................... 451/51
  See application file for complete search history.

(56) References Cited

U.S. PATENT DOCUMENTS

| | | | | |
|---|---|---|---|---|
| 3,797,338 | A * | 3/1974 | Molnar | B23D 45/124 |
| | | | | 83/411.6 |
| 8,568,203 | B2 | 10/2013 | Sato et al. | |
| 8,702,083 | B2 | 4/2014 | Doi et al. | |
| 8,702,084 | B2 | 4/2014 | Doi et al. | |
| 2011/0312255 | A1 * | 12/2011 | Akada | B24B 27/0076 |
| | | | | 451/57 |
| 2017/0087637 | A1 | 3/2017 | Tobita | |

FOREIGN PATENT DOCUMENTS

| | | |
|---|---|---|
| CN | 105936346 A | 9/2016 |
| CN | 106560284 A | 4/2017 |
| JP | 2010-110850 A | 5/2010 |
| JP | 2010-110851 A | 5/2010 |
| JP | 2010-110966 A | 5/2010 |
| JP | 2010-253590 A | 11/2010 |
| JP | 2011-156655 A | 8/2011 |
| JP | 2011-156863 A | 8/2011 |
| JP | 2012-708 A | 1/2012 |

OTHER PUBLICATIONS

Extended European Search Report dated Oct. 22, 2018, issued in counterpart European Application No. 18173038.3 (in English; 9 pages).
Office Action dated May 19, 2020, issued in counterpart Japanese Application No. 2017-104336 (w/ English translation; 6 pages).
Office Action dated Mar. 17, 2021, issued in counterpart Chinese Application No. 201810512519 6 (w/ English translation; 34 pages).

* cited by examiner

APPARATUS AND METHOD FOR CUTOFF MACHINING SINTERED MAGNET

CROSS-REFERENCE TO RELATED APPLICATION

This non-provisional application is a Continuation of U.S. application Ser. No. 15/980,013 filed on May 15, 2018, which claims priority under 35 U.S.C. § 119(a) to Japanese Patent Application No. 2017-104336 filed in Japan on May 26, 2017, the entire contents of each of the foregoing are hereby incorporated by reference.

TECHNICAL FIELD

This invention relates to an apparatus and method for cutoff machining a sintered magnet such as rare earth sintered magnet, typically Nd—Fe—B sintered magnet.

BACKGROUND ART

Systems for manufacturing commercial products of sintered magnet include a single part system wherein a sintered magnet part of substantially the same shape as the product is produced, and a multiple part system wherein a large sintered magnet block is divided into a multiplicity of parts by machining. When it is desired to manufacture parts of small size or parts having a reduced thickness in magnetization direction, the single part system is difficult to form sintered magnet parts of high accuracy size and shape. Thus the multiple part system is the mainstream of sintered magnet manufacture.

As the tool for sawing rare earth sintered magnet blocks, a grinding wheel outer-diameter (OD) blade having diamond grits bonded to the outer periphery of a thin disk as a core is mainly used from the aspect of productivity. In the case of OD blades, multiple sawing is possible. A multiple blade assembly comprising a plurality of cutoff abrasive blades coaxially mounted on a rotating shaft alternately with spacers, for example, is capable of multiple cutoff machining, that is, to machine a block into a multiplicity of parts at a time.

Before the sintered magnet is cutoff machined, it is fixedly secured to a jig by a suitable means, for example, by adhesive bonding with a thermoplastic resin adhesive, or by direct attachment utilizing the resilience of the jig itself or the restoring force of a spring or elastomer.

CITATION LIST

Patent Document 1: JP-A 2010-110850
Patent Document 2: JP-A 2010-110851
Patent Document 3: JP-A 2010-110966
Patent Document 4: JP-A 2011-156655
Patent Document 5: JP-A 2011-156863
Patent Document 6: JP-A 2012-000708 (US 20110312255)

DISCLOSURE OF INVENTION

The method of cutoff machining a sintered magnet block which is secured by a jig repeats the steps of mounting the jig having the magnet block secured thereto on a cutoff machining tool, cutoff machining the magnet block into pieces, taking the jig having the magnet pieces still secured thereto out of the tool, securing a new magnet block to the jig, and mounting the jig with the new magnet block on the tool again. After the jig is taken out of the machining tool, the divided (or sawed) magnet pieces are removed from the jig, and a magnet block to be sawed is newly secured to the jig. In the step of securing a magnet block to the jig, especially by adhesive bonding, the operation of manually bonding and confirming a secure attachment is necessary to avoid the risk that the magnet block is disengaged from the jig during the cutoff machining step, causing the magnet block, outer cutoff blade, and machining tool to be damaged. Since the procedure involving such operation is difficult to automate, there is a need for a labor- and energy-saving method of securing and cutoff machining sintered magnet.

An object of the invention is to provide an apparatus and method for cutoff machining a sintered magnet without a need for attachment and detachment of the magnet to a jig and a need for mounting and dismounting of the jig to a cutoff machining tool.

The invention provides a sintered magnet cutoff machining apparatus comprising the following components:

(1) a cylindrical or columnar work carrier mounted on a horizontal rotating spindle and having a generally regular polygonal shape in a cross section perpendicular to the rotating spindle, with the proviso that the polygon has 3 to 180 sides, the work carrier including work seats formed on the respective sides of the peripheral surface of the polygonal work carrier, the seats being arranged in the rotational direction of the work carrier;

(2) a plurality of endless elastic belts which are extended so as to come in proximity to a portion of the peripheral surface of the work carrier, adapted to force a work of sintered magnet against the peripheral surface of the work carrier to secure the work, and adapted to travel synchronously with and counter to the rotation of the work carrier in a circulatory manner, the plurality of elastic belts being extended such that the work resting on each seat is secured thereto by at least two elastic belts which are juxtaposed at a spacing, (3) a belt expanding mechanism for tensioning the belts, (4) at least two belt supports for supporting the belts in tension and adapted to change the traveling direction of the belts during their circulatory travel, the at least two belt supports including a first belt support disposed above the rotating spindle of the work carrier and in proximity to a portion of the peripheral surface of the work carrier which extends from the top of the work carrier to a forward position in the rotational direction of the work carrier, and a second belt support disposed below the rotating spindle of the work carrier and in proximity to a portion of the peripheral surface of the work carrier which extends from the bottom of the work carrier to an aft position in the rotational direction of the work carrier, and (5) an outer cutoff blade mounted on a horizontal rotating shaft and adapted to move toward the work carrier such that a circumferential edge of the blade is close to the peripheral surface of the work carrier.

The cutoff machining apparatus of the invention operates as follows. As the work carrier rotates, the work is delivered to the peripheral surface of the work carrier from an aft position in the rotational direction of the work carrier with respect to the first belt support, and secured to the work seat by the elastic belts between the first and second belt supports. In accordance with rotation of the work carrier, the work is moved forward and cutoff machined into pieces by the outer cutoff blade which is inserted through the spacing between the at least two elastic belts (securing the work) toward the peripheral surface of the work carrier. In accordance with rotation of the work carrier, the divided (or sawed) work is moved further forward, released from the seat, and discharged from the work carrier at a forward position in the rotational direction of the work carrier with respect to the second belt support.

The invention also provides a method for cutoff machining a sintered magnet by means of the cutoff machining apparatus. The method involves the steps of delivering the work onto the peripheral surface of the work carrier from an aft position in the rotational direction of the work carrier with respect to the first belt support, and securing the work to the work seat by the elastic belts between the first and second belt supports in accordance with rotation of the work carrier; moving the work forward in accordance with rotation of the work carrier and inserting the outer cutoff blade through the spacing between the at least two elastic belts toward the peripheral surface of the work carrier, for thereby cutoff machining the work; moving the divided (sawed) work further forward in accordance with rotation of the work carrier, releasing it from the work seat, and discharging it from the work carrier at a forward position in the rotational direction of the work carrier with respect to the second belt support.

With the cutoff machining apparatus and method of the invention, a series of steps of fixedly attaching a work of sintered magnet to a carrier, cutoff machining the work by an outer cutoff blade, detaching the divided work and discharging from the carrier can be automatically performed. Accordingly, the steps of continuously delivering works onto the peripheral surface of a work carrier, clamping each work between the carrier and elastic belts and securing it to a seat on the carrier, moving the work forward in accordance with rotation of the carrier, cutoff machining the secured work by an outer cutoff blade which is disposed forward in the moving direction, and detaching and discharging the divided work are carried out in a serial flow with rotation of the carrier. The cutoff machining apparatus and method eliminate a need for attachment and detachment of sintered magnet to and from a jig and a need for mounting and dismounting of the jig to and from a sawing machine, as required in the prior art, and are successful in continuously securing and cutoff machining sintered magnet works at a high productivity and high accuracy while reducing the standby time of the apparatus.

The cutoff machining apparatus may further include a nozzle for supplying a coolant to the site where the work is cutoff machined by the outer cutoff blade. The provision of the nozzle enables positive cooling of the cutoff site.

A plurality of work seats are formed on the respective sides of the peripheral surface of the polygonal carrier and arranged in the rotating spindle direction of the carrier. Then a plurality of works may be arranged at a time in the rotating spindle direction of the work carrier. Further, the outer cutoff blade takes the form of a multiple blade assembly having a plurality of outer cutoff blades mounted on the rotating shaft with spacers interposed between the blades. Using the multiple blade assembly, one work can be divided (or sawed) into two or three or more pieces at a time. Also a plurality of works arranged in the rotating spindle direction of the work carrier can be divided (or sawed) each into two or three or more pieces at a time.

The peripheral surface of the work carrier may be provided with a groove in the rotational direction of the work carrier. The groove allows for entry of the circumferential edge of the outer cutoff blade. This ensures to cut the work to its bottom and prevents the outer cutoff blade from contacting the carrier. Also the work seat may be provided with grooves at opposite ends in the rotating spindle direction of the work carrier. Through these grooves, the coolant (or machining slurry) and chips or sludge resulting from machining may be effectively discharged at the contact area between the work and the seat and nearby.

Belt abutments may be formed at the edges between sides of the peripheral surface of the polygonal carrier for supporting the belt in the absence of a work and restraining the belt from shifting in the rotating spindle direction of the work carrier. The belt abutments are typically formed in line with each belt. In one embodiment, the belt abutment may project radially outward from the edge on the work carrier. Then, when no works are rested on some or all seats, for example, at the start of machining operation when a first work is secured, or at the end of machining operation when a last work is released, the elastic belts are supported by those belt abutments on the carrier. This allows the elastic belts to travel in a circulatory manner synchronously with rotation of the carrier. The belt abutments prevent the elastic belts from sagging when the works are delivered, helping secure works. The belt abutments may have a height lower than the height of the work which is secured to the seat. With this setting, when the works are sequentially delivered and secured to the seats on the carrier in the rotational direction of the carrier, the elastic belt does not contact the abutment between works, but contacts the works arranged in the rotational direction of the carrier like a bridge between the works. Then the pressing force of the belt is concentrated only on the works, achieving tight attachment of the works.

In a preferred embodiment, the belt supports further include third and fourth belt supports which are disposed outside the area where the belts come close to the peripheral surface of the carrier, for keeping the elastic belts in tension and changing the traveling direction of the belts during their circulatory travel. The belt expanding mechanism is constructed such as to expand the endless elastic belts, specifically to pull the belts outside their track or push the belts inside their track between the third and fourth belt supports for tensioning the belts more intensely. Then the tension state of the belts for imparting a pressing force to the work is consistently established.

While the work may be manually delivered onto the peripheral surface of the carrier, the cutoff machining apparatus preferably further includes an inlet conveyor disposed near the area where the work is delivered onto the peripheral surface of the carrier for conveying the work to the area. Also preferably a guide is disposed in the area where the work is delivered onto the peripheral surface of the work carrier for resting the work in place on the seat at the work delivery position, i.e., placing the work in alignment with the seat at the work delivery position. This ensures that the attitude and position of the work which is delivered to the seat are easily controlled as desired.

Also preferably, the cutoff machining apparatus further includes an outlet conveyor disposed near the area where the divided (or sawed) work is released from the seat and discharged from the work carrier, for conveying the divided work out of the area. Then the divided works may be continuously discharged.

Advantageous Effects of Invention

The cutoff machining apparatus and method of the invention eliminate a need for attachment and detachment of sintered magnet to and from a jig and a need for mounting and dismounting of the jig to and from a cutoff machining machine, and are successful in cutoff machining a sintered magnet at a high productivity and high accuracy.

DESCRIPTION OF PREFERRED EMBODIMENTS

In the following description, like reference characters designate like or corresponding parts throughout the several views shown in the figures. It is also understood that terms such as "top," "bottom," "outward," "inward," and the like are words of convenience and used as viewed in FIG. 1 and are not to be construed as limiting terms. The term "cutoff machining" is interchangeable with sawing.

Figure 1:
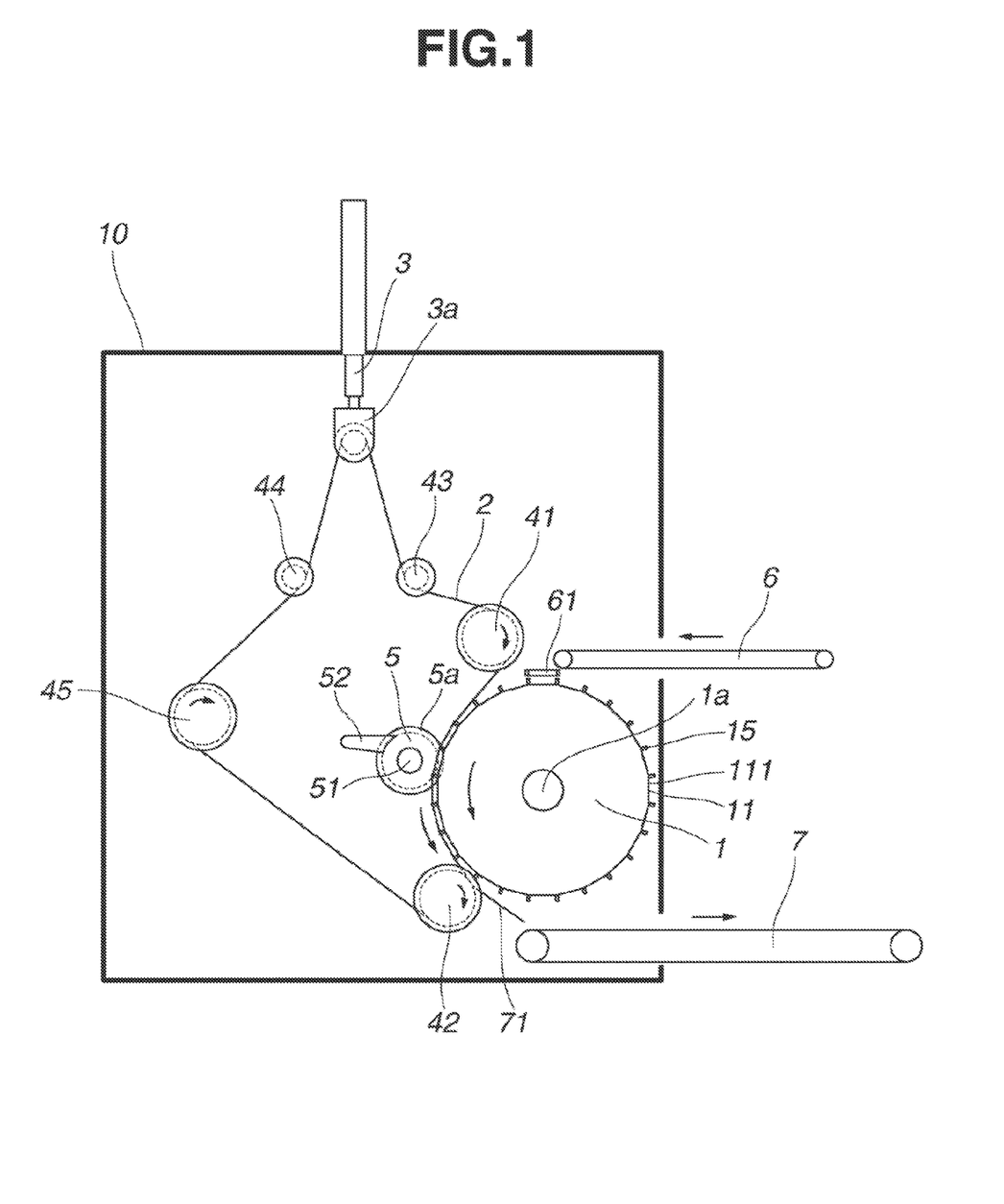
FIG. 1 is a side elevational view of a cutoff machining apparatus in one embodiment of the invention.

Referring to FIG. 1, there is illustrated in a side elevational view a cutoff machining or sawing apparatus in one embodiment of the invention. The cutoff machining apparatus includes a work carrier 1, an elastic belt 2, a belt expanding mechanism 3, a first belt support 41, a second belt support 42, and an outer cutoff blade 5, which are enclosed in a frame/housing 10.

Figure 2:
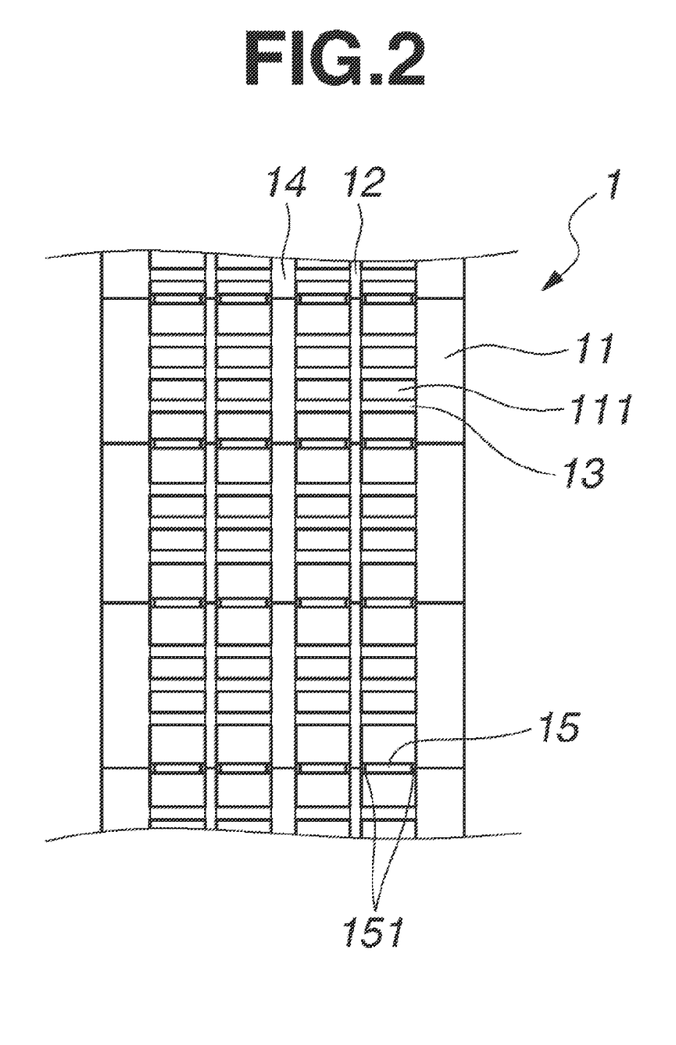
FIG. 2 is a view of a portion of the work carrier in FIG. 1.

The work carrier 1 is a cylindrical or columnar rotating drum mounted on a horizontal rotating spindle 1a and having a generally regular polygonal shape in a cross section perpendicular to the rotating spindle 1a. As used herein, the polygonal shape is a figure having at least 3 sides, preferably at least 6 sides, more preferably at least 12 sides and up to 180 sides, preferably up to 60 sides. In FIG. 1, a columnar rotating drum of regular 24-sided polygonal shape is illustrated. The work carrier 1 has a peripheral surface which consists of a plurality of sides (24 sides in FIG. 1) corresponding to the number of edges (24 edges in FIG. 1) of the polygonal shape. Differently stated, surface sides 11 are defined by polygonally dividing the peripheral surface of the work carrier 1 of polygonal cross-sectional shape (regular 24-sided polygonal shape in FIG. 1). FIG. 2 is a partial elevational view of the work carrier 1 in FIG. 1, wherein work seats 111 are formed on the respective sides 11 of the peripheral surface of the polygonal work carrier 1 and arranged in the rotational direction of the work carrier 1. For each side 11, there may be provided only one work seat 111 or two or more work seats 111. For example, for each of the sides 11 which constitute the peripheral surface of the polygonal work carrier 1, there may be provided plural (e.g., 2 to 50) work seats 111 which are arranged in the rotating spindle direction of the work carrier 1. In the example of FIG. 2, two work seats 111 are arranged for each side 11 in the rotating spindle direction of the work carrier 1. Accordingly, the work carrier 1 shown in FIG. 2 includes forty eight (48), in total, work seats 111 in the sense that twenty four (24) work seats 111 are arranged in the rotational direction of the work carrier 1 and two rows of work seats 111 are juxtaposed in the rotating spindle direction of the work carrier 1.

The peripheral surface of the work carrier 1 is provided, specifically within the work seats 111, with a groove 12 extending in the rotational direction of the work carrier, so that the circumferential edge of the outer cutoff blade 5 may enter the groove 12. The groove 12 ensures that the outer cutoff blade 5 cutoff machines the work to its bottom (i.e., the lower surface of the work facing the work carrier 1) without contacting the work carrier 1. The groove 12 is formed in accordance with the cutoff position and division number of the work. In the work carrier 1 shown in FIG. 2, for example, wherein one work is cutoff machined at one position in the work seat 111 into two pieces, there are provided two, in total, grooves 12 in the sense that one groove is provided for each of two rows of work seats 111 juxtaposed in the rotating spindle direction of the work carrier 1.

Also the peripheral surface of the work carrier 1 may be provided, specifically within the work seats 111, with grooves 13 extending toward opposite ends in the rotating spindle direction of the work carrier 1. The grooves 13 extending in the rotating spindle direction allow the coolant and chips (resulting from cutoff machining) to be discharged efficiently at the contact between the work and the work seat 111 and nearby. In the work carrier 1 shown in FIG. 2, for each of the work seats 111, three grooves 13 extend in the rotating spindle direction of the work carrier 1. It is noted that another groove 14 may be formed between two rows of work seats 111 juxtaposed in the rotating spindle direction of the work carrier 1. This circumferential groove 14 functions as an opening for discharging the coolant and chips outside from the axially extending grooves 13 in the state that the work is in contact with the work carrier 1. It is acceptable that the circumferential edge of the outer cutoff blade, which does not participate in cutoff machining, enters the groove 14. In the work carrier 1 shown in FIG. 2, the groove 14 extends between the rows of work seats 111 arranged in the rotational direction of the work carrier 1, along the rotational direction of the work carrier 1 (i.e., circumferentially), and between juxtaposed work seats 111. That is, one groove 14 is formed between two work seats 111.

Further the work carrier 1 is provided, as shown in FIG. 2, at the edges on the peripheral surface of the polygonal work carrier 1, that is, at the junctions (24 junctions in FIG. 1) between sides 11 constituting the peripheral surface of the polygonal work carrier 1, with belt abutments 15 for supporting the elastic belt 2 in the absence of any work and for restraining the elastic belt 2 from any shift in the rotating spindle direction of the work carrier 1. As shown in FIG. 2, for example, the belt abutment 15 may project radially outward or upright from the edge on the peripheral surface of the work carrier 1 in a direction perpendicular to the rotating spindle of the work carrier 1. Each belt abutment 15 has a pair of collars 151, 151 protruding like horns from the side of the abutment disposed remote from the rotating spindle of the work carrier 1 at the opposite ends in the rotating spindle direction of the work carrier 1. The pair of collars 151, 151 come in engagement with the elastic belt 2 for restraining the elastic belt 2 from any shift in the rotating spindle direction of the work carrier 1. It is noted that when a work is rested on the work seat 111, but has not been secured thereto by the elastic belt 2, the belt abutments 15 also play the role of restraining the work from shifting forward or aft (or falling down) in the rotational direction of the work carrier 1.

The belt abutments 15 are typically formed for each elastic belt 2. The work carrier 1 shown in FIG. 2 is designed such that one work is secured by two elastic belts 2. Two belt abutments 15 are formed for each work seat 111, namely two belt abutments 15 are formed forward or aft of the work seat 11 in the rotational direction of the work carrier 1. For twenty four (24) work seats 111 arranged in the rotational direction of the work carrier 1, forty eight (48) belt abutments 15 are formed. Further, since two rows of work seats 111 are juxtaposed in the rotating spindle direction of the work carrier 1, ninety six (96) belt abutments 15 are formed on the overall work carrier 1. The height of belt abutments 15 is lower than the height of the work which is rested on and secured to the work seat.

The elastic belt 2 is an endless belt. As shown in FIG. 1, the belt 2 is extended so as to come close to a portion of the peripheral surface of the work carrier 1, adapted to force a work of sintered magnet against the peripheral surface of the work carrier 1 to secure the work, and adapted to move synchronously with and counter to the rotation of the work carrier 1 in a circulatory manner. In the cutoff machining apparatus of FIG. 1, the elastic belt 2 is extended along the peripheral surface of the work carrier 1 on its side (left side in FIG. 1) where the peripheral surface moves from upward to downward during rotation of the work carrier 1 and so as to come close to a portion of the peripheral surface of the work carrier 1 between a first belt support 41 and a second belt support 42 to be described below. The belt 2 is adapted to travel synchronously with and counter to the rotation of the work carrier in a circulatory manner. In the cutoff machining apparatus of FIG. 1, the work carrier 1 rotates counterclockwise and the belt 2 travels generally clockwise, counter to the rotation of the work carrier 1 in a circulatory manner.

Figure 3:
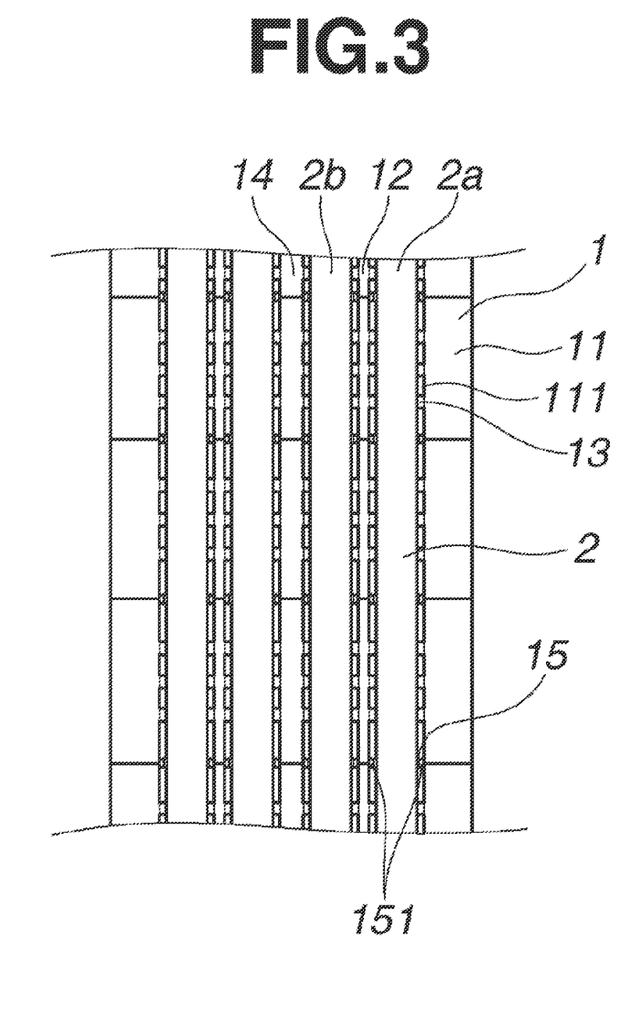
FIG. 3 is a view of the same portion as FIG. 2, showing that elastic belts are close to the work carrier.

FIG. 3 is a partial side view showing that the elastic belt 2 is close to the work carrier 1. As shown in FIGS. 1 and 3, the belt 2 is extended to bridge the belt abutments 15 arranged in the rotational direction of the work carrier 1 when no works are delivered. The cutoff machining apparatus is designed such that each work resting on the work seat 111 is secured thereto by at least two elastic belts 2. This means that plural (i.e., two or more) elastic belts 2 are included. In the work carrier 1 shown in FIG. 3, one work is secured to the seat 111 by two elastic belts 2a, 2b. Two elastic belts 2a, 2b are extended in proximity to the work carrier 1 for the row of the work seats 111 arranged in the rotational direction of the work carrier 1. Since there are two rows of the work seats 111 arranged in the rotational direction of the work carrier 1, four elastic belts 2 are included on the overall work carrier 1. It is noted that for simplicity's sake, only one elastic belt 2 is shown in FIG. 1.

The plural elastic belts 2 for securing one work are juxtaposed at a predetermined spacing so that the outer cutoff blade 5 may be inserted through the spacing. Then the circumferential edge (abrasive cutting edge) 5a of the outer cutoff blade 5 can cutoff machine the work without contact with the belts 2. Accordingly, the spacing between the belts 2 is defined, as shown in FIGS. 2 and 3, at a position corresponding to the groove 12 in the work carrier 1 for allowing entry of the circumferential edge 5a of the outer cutoff blade 5.

The cutoff machining apparatus includes two or more belt supports. The belt supports serve to support the belt 2 in tension and to change the traveling direction of the belt 2 during its circulatory travel. Each belt support is preferably a roller of circular cross-sectional shape. The belt support contacts the belt 2 at its peripheral surface and changes the traveling direction of the belt 2 as the support rotates.

Figure 4:
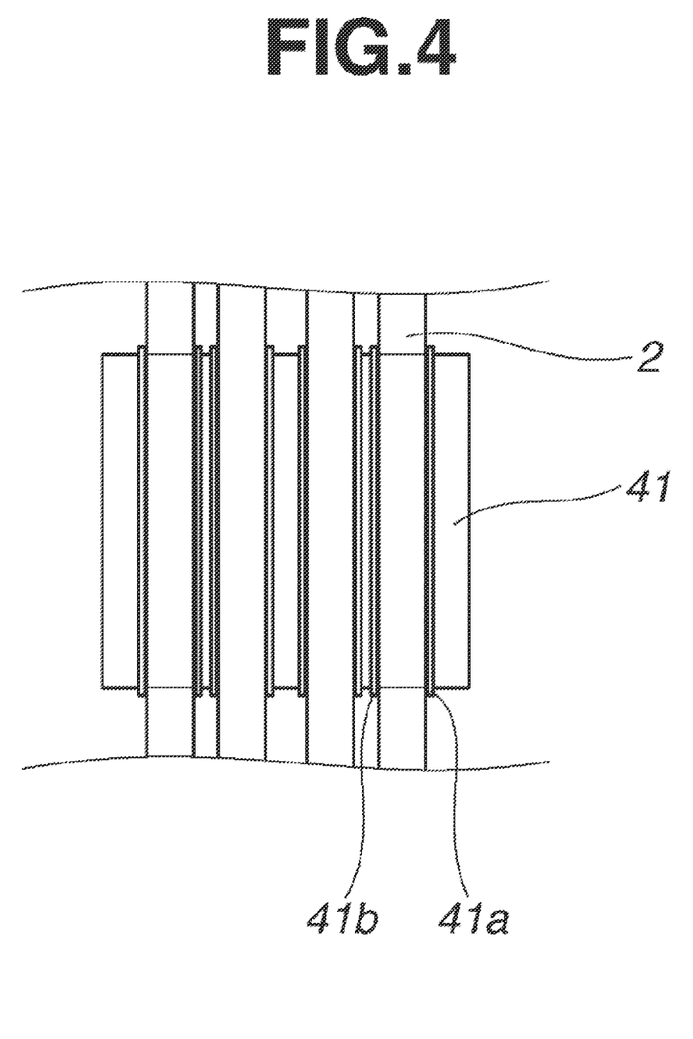
FIG. 4 is a side view showing that the belts are supported by the first belt support in the apparatus of FIG. 1.

The cutoff machining apparatus includes a first belt support disposed above the rotating spindle of the work carrier 1 and in proximity to the peripheral surface of the carrier 1 and a second belt support disposed below the rotating spindle of the carrier 1 and in proximity to the peripheral surface of the work carrier. The cutoff machining apparatus shown in FIG. 1, for example, includes a first belt support 41 disposed above the rotating spindle 1a of the carrier 1 and in proximity to a portion of the peripheral surface of the carrier 1 which extends from the top of the carrier 1 to a forward position in the rotational direction of the carrier 1, and a second belt support 42 disposed below the rotating spindle 1a of the carrier 1 and in proximity to a portion of the peripheral surface of the carrier 1 which extends from the bottom of the carrier to an aft position in the rotational direction of the carrier 1. The elastic belt 2 is traveled in proximity to the peripheral surface of the work carrier 1, tensioned by the belt expanding mechanism 3 to be described later, and supported in tension by the first and second belt supports or rollers 41 and 42. In this state, the traveling direction of the belt 2 is changed during their circulatory travel. Specifically, the first belt support 41 acts to change the traveling direction of the elastic belt 2 from the side (left side in FIG. 1) spaced apart from the peripheral surface of the carrier 1 to a direction parallel to the peripheral surface of the carrier 1. The second belt support 42 acts to change the traveling direction of the elastic belt 2 from a direction parallel to the peripheral surface of the carrier 1 to the side (left side in FIG. 1) spaced apart from the peripheral surface of the carrier 1. With this arrangement, a force to move the belt 2 toward the peripheral surface of the carrier 1 is created near the carrier 1. This force causes the belt 2 to force the work against the seat 11, i.e., to clamp the work between the belt 2 and the seat 111 (or carrier 1) for securing the work in place. FIG. 4 is a side elevational view showing that the elastic belt 2 is supported by the first belt support 41 in the cutoff machining apparatus of FIG. 1. Specifically, four belts 2 are supported by the first belt support 41. Similarly four belts 2 are supported by the second belt support 42, though not shown. As shown in FIG. 4, the first belt support 41 is provided with a pair of annular guides 41a, 41b for each of the elastic belts 2 for restraining the belt from shifting in the rotation spindle direction of the carrier 1. Then the elastic belt 2 comes in contact with the peripheral surface of the first belt support 41 between the guides 41a and 41b. In the cutoff machining apparatus of FIG. 1, the second belt support 42 is also provided with similar guides. Belt supports other than the first and second belt supports 41 and 42 may also be provided with annular guides.

Figure 5:
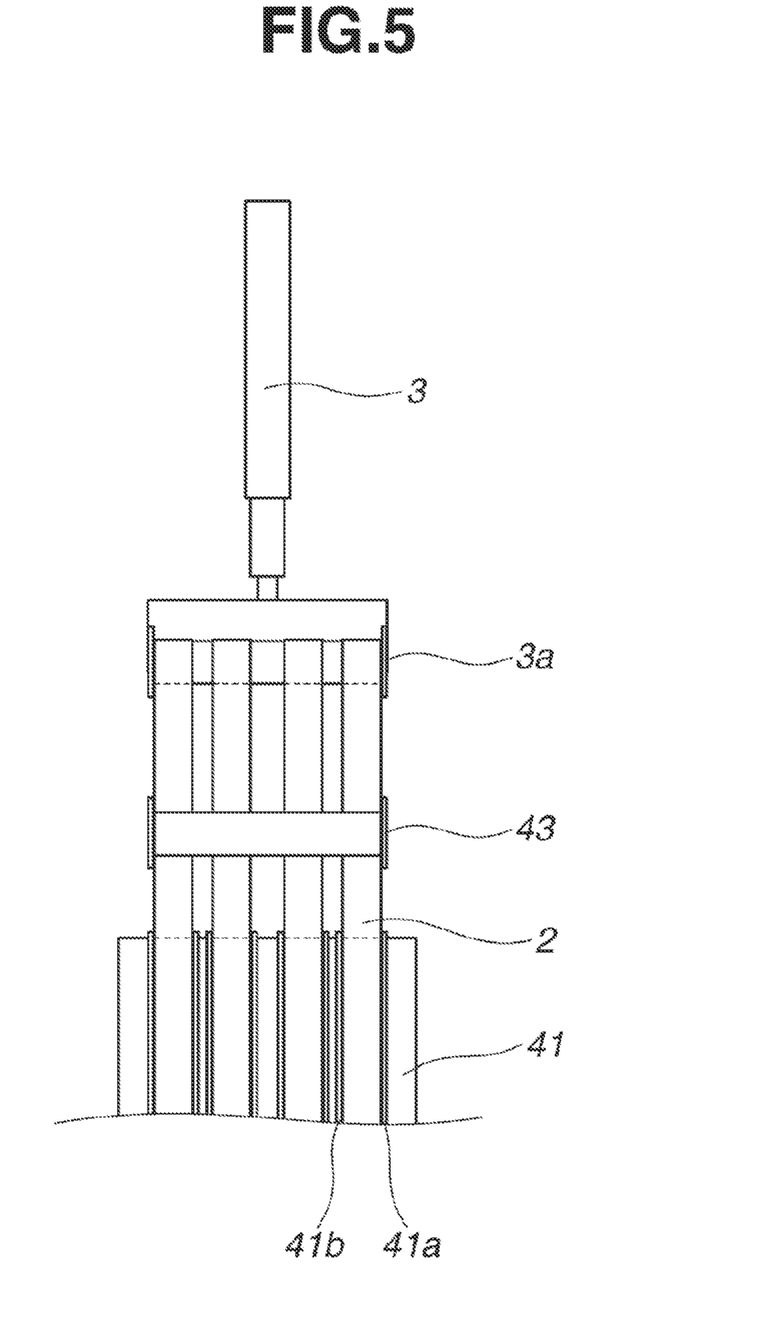
FIG. 5 is a side view showing a belt expanding mechanism and third and fourth belt supports in the apparatus of FIG. 1.

The belt expanding mechanism 3 serves to tension the elastic belts 2. The belt expanding mechanism 3 is not particularly limited as long as it can expand the elastic belt 2 so as to create a force to move the belt toward the peripheral surface of the carrier 1. As shown in FIGS. 1 and 5, for example, third and fourth belt supports 43 and 44 are provided for supporting in tension a portion of the belt 2 other than the portion thereof extending in proximity to the peripheral surface of the carrier 1 and changing the traveling direction of the belt 2 during its circulatory travel. The belt expanding mechanism 3 serves to act on the endless elastic belt 2 between the third and fourth belt supports 43 and 44 so as to pull the belt outward or push the belt inward of its track to tension the belt. In this embodiment, the third and fourth belt supports 43 and 44 are pulleys. The belt expanding mechanism 3 also has a pulley 3a at its distal or lower end. The pulley 3a of the belt expanding mechanism 3 also serves to support the belt 2 in tension and change the traveling direction of the belt 2 during its circulatory travel. The pulley 3a is also constructed such that it may contact on its peripheral surface with the belt 2 and change the traveling direction of the belt 2 as the pulley rotates.

Besides the first to fourth belt supports 41, 42, 43, 44, the cutoff machining apparatus may further include additional belt supports. For example, a fifth belt support 45 is included in FIG. 1. In the illustrated embodiment, the fifth belt support 45 is spaced apart from the work carrier 1 and positioned far away from the area where the belt expanding mechanism 3 and the third and fourth belt supports 43, 44 are installed. Additional belt supports may be provided in conjunction with the position of the belt expanding mechanism 3 and for the purpose of maintaining a space within the apparatus.

Figure 6:
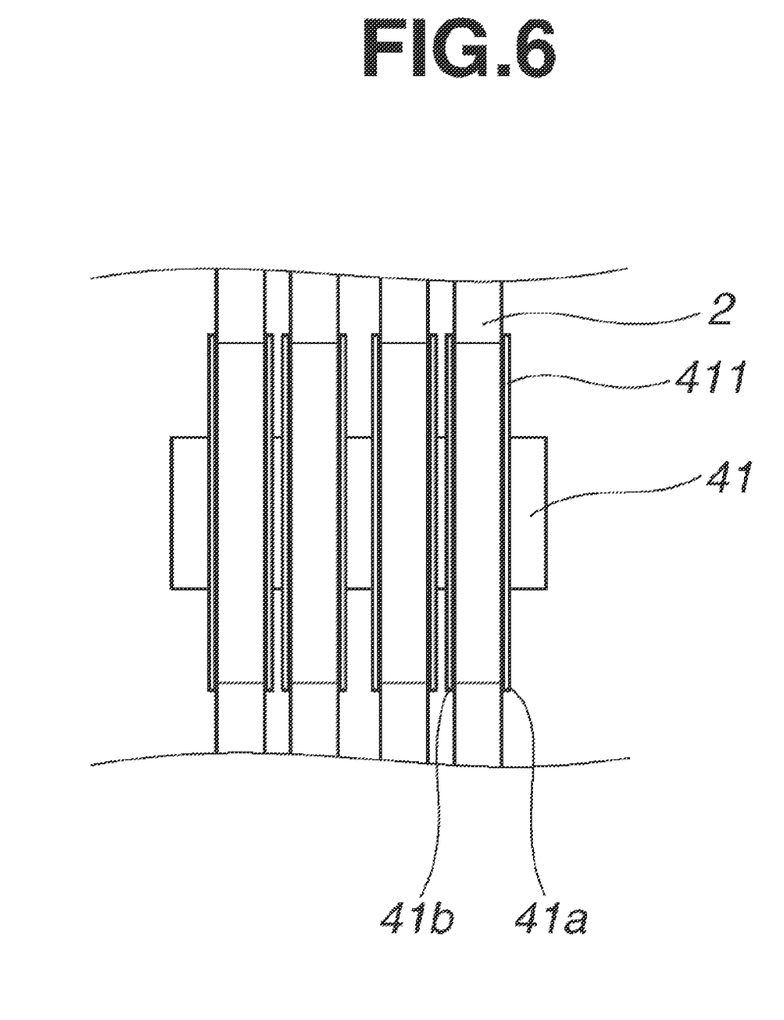
FIG. 6 is a side view showing that the belts are supported by the first belt support in another example in the apparatus of FIG. 1.

With respect to the first and second belt supports 41, 42 and other belt supports, one belt support is used to support all elastic belts 2 as shown in FIG. 4, or plural belt supports are provided independently for one belt or some belts so that independent motion may be available for each of belts 2. Specifically, as shown in FIG. 6, the belt support may be an assembly of plural pulleys 411 corresponding to individual elastic belts 2. FIG. 6 is a side elevational view showing the other embodiment wherein the elastic belts 2 are supported by the first belt support 41 in the cutoff machining apparatus of FIG. 1. In this embodiment, four elastic belts 2 are independently supported by four pulleys 411. Notably, the belt support in FIG. 6 is provided with a pair of annular guides 41a, 41b for each of the pulleys 411 (i.e., each of the elastic belts 2) for restraining the belt from shifting in the rotation spindle direction of the carrier 1, and the belt 2 contacts the peripheral surface of the pulley 411 between the guides 41a and 41b.

The outer cutoff blade 5 having a circumferential edge is mounted on a horizontal rotating shaft and adapted to move toward and away from the work carrier 1. Specifically, the outer cutoff blade 5 is adapted to move toward and away from the peripheral surface of the work carrier 1 between the first and second belt supports 41 and 42. The position where the cutoff blade 5 approaches the peripheral surface of the carrier 1 is preferably an intermediate position between the first and second belt supports 41 and 42 so that chips may be efficiently discharged from near the cutoff blade 5. The cutoff blade 5 is combined with a mechanism for moving and securing the cutoff blade 5 so that the cutoff blade 5 may be moved and secured to the cutoff site. The cutoff blade 5 is positioned such that it may pass through the spacing between the elastic belts 2 (for securing the work), and the circumferential edge of the cutoff blade 5 may reach the groove 12 formed in the seats 111 on the work carrier 1.

Figure 7:
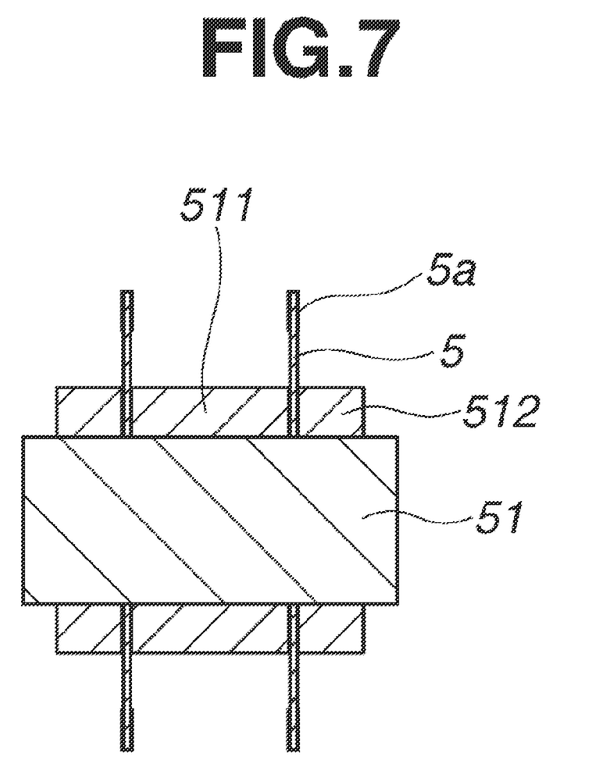
FIG. 7 is a cross-sectional view of a multiple blade assembly in the apparatus of FIG. 1.

When works are arranged as a single row in the rotational direction of the carrier 1 and cutoff machining is done at only one site, the outer cutoff blade 5 may be a single blade. When cutoff machining is at two or more sites or when a plurality of works are arranged in the rotating spindle direction of the carrier 1, the outer cutoff blade 5 preferably takes the form of a multiple blade assembly having a plurality of outer cutoff blades 5 mounted on a rotating shaft with a spacer interposed between the blades. In the multiple blade assembly, the number of blades is two or more and may be selected as appropriate depending on a particular sawing application. Then with rotation of the work carrier 1, one work can be cutoff machined at plural sites (two or more sites) at a time, or plural works can be cutoff machined at a time. FIG. 7 is a cross-sectional view of the multiple blade assembly in the cutoff machining apparatus of FIG. 1. The multiple blade assembly has a plurality of outer cutoff blades 5 which are mounted on a rotating shaft 51 while a spacer 511 is interposed between the blades 5. Each outer cutoff blade 5 has an abrasive cutting edge portion 5a on its circumferential edge. As the blade 5 is rotated, the cutting edge portion 5a acts to gradually machine the work and finally cut (or divide) it into pieces. The cutoff machining apparatus illustrated in FIGS. 1 and 7 uses a multiple blade assembly of two, in total, outer cutoff blades 5 wherein one outer cutoff blade 5 cutoff machines one work at one site into two pieces and one outer cutoff blade 5 is assigned to each of two works arranged in the rotating spindle direction of the carrier 1. One spacer 511 is interposed between two outer cutoff blades 5, and the blades 5 are secured by end caps 512 mounted on opposite ends of the rotating shaft 51.

Preferably a nozzle is provided in proximity to the outer cutoff blade 5, especially in proximity to the circumferential edge of the outer cutoff blade 5, for supplying a coolant to the cutoff site on the work by the blade 5. The provision of the nozzle ensures effective cooling of the cutoff site. In the cutoff machining apparatus of FIG. 1, for example, a nozzle 52 is provided in proximity to the blade 5 for supplying coolant toward the circumferential edge of the blade 5. Once the coolant is injected from the nozzle 52, the coolant is entrained on the blade 5 and conveyed to the cutoff site on the work in accordance with rotation of the blade 5.

In the cutoff machining apparatus of the invention, works may be sequentially delivered by manual operation. Preferably an inlet conveyor is provided in an area where the work is delivered onto the peripheral surface of the work carrier. In the cutoff machining apparatus of FIG. 1, for example, an inlet conveyor 6 for conveying works is provided in an area where the work is delivered onto the peripheral surface of the work carrier 1. Works are conveyed from the outside end to the inside end of the inlet conveyor 6 where the works are delivered onto the peripheral surface of the carrier 1. When the work is delivered from the inside end of the inlet conveyor 6 to the peripheral surface of the carrier 1, the work is allowed to fall down under gravity. Alternatively, a transfer mechanism may be provided between the inside end of the inlet conveyor 6 and the peripheral surface of the carrier 1 for transferring the work from the inlet conveyor 6 onto the peripheral surface of the carrier 1.

Figure 8:
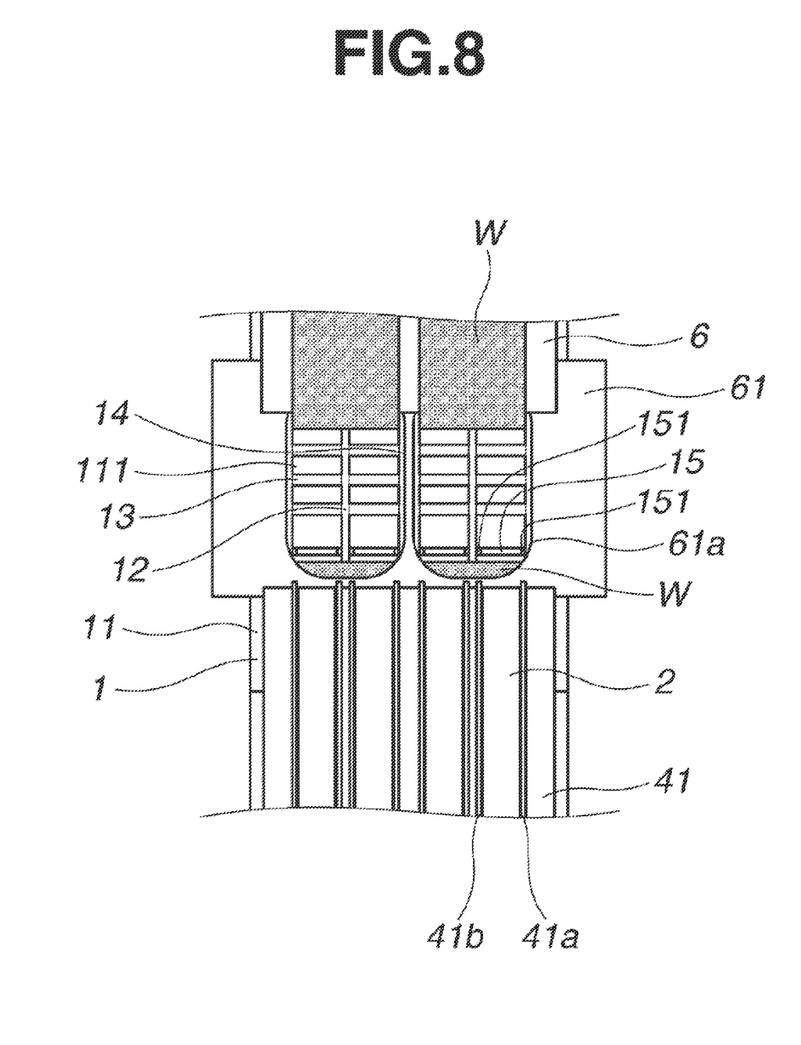
FIG. 8 is a partial plan view of the work carrier in the apparatus of FIG. 1, as viewed from the top, showing that a work is delivered to a seat on the work carrier.

In the cutoff machining apparatus, a guide is preferably disposed where the work is delivered onto the peripheral surface of the carrier for placing the work in alignment with the position where the work is rested on the seat 111. More preferably the guide is of the structure capable of centering the work in accordance with rotation of the carrier 1. In the cutoff machining apparatus of FIG. 1, a guide 61 is disposed above the carrier 1 where the work is delivered onto the peripheral surface of the carrier 1. As best shown in FIG. 8, the guide 61 is provided with two openings 61a whose position and size correspond to the position where the work is rested on the seat 111 and the size of the work, respectively.

In the cutoff machining apparatus, divided work (i.e., pieces of a work of sintered magnet) may be sequentially recovered by gravity fall or manually. Preferably, an outlet conveyor is provided in an area where the divided work is released from the seat, for carrying out the divided work. In the embodiment wherein the outlet conveyor is provided, a chute is preferably provided for guiding the divided work when the divided work released from the peripheral surface of the carrier is transferred to the outlet conveyor. In the cutoff machining apparatus of FIG. 1, for example, an outlet conveyor 7 for conveying works is provided in an area where the divided work is released from the seat 111. The divided work is conveyed from the inside end to the outside end of the outlet conveyor 7, that is, from the area where the divided work is released from the seat 111 to the outside end of the outlet conveyor 7. A plate-shaped chute 71 is disposed in proximity to the peripheral surface of the carrier 1 to form a bridge between the area where the divided work is released from the seat 111 and the inside end of the outlet conveyor 7. The divided work slides down the chute 71 and reaches the inside end of the outlet conveyor 7.

Now the method of cutoff machining a work of sintered magnet using the cutoff machining apparatus of the invention is described with reference to the drawings.

FIG. 8 is a partial plan view of the work carrier 1 in the cutoff machining apparatus of FIG. 1 as viewed from above, illustrating how a work W is delivered to the seat 111 on the carrier 1. The work W is typically of rectangular shape, preferably plate shape. The work W typically has a thickness of at least 0.1 mm, especially at least 1 mm and up to 30 mm, especially up to 10 mm. The thickness of the work corresponds to the distance between the elastic belt and the work carrier when the work is secured to the seat on the carrier by the elastic belt. The work W is first conveyed by inlet conveyor 6 to its inside end near carrier 1, moved past opening 61a in guide 61, and delivered onto seat 111 on carrier 1.

Figure 9:
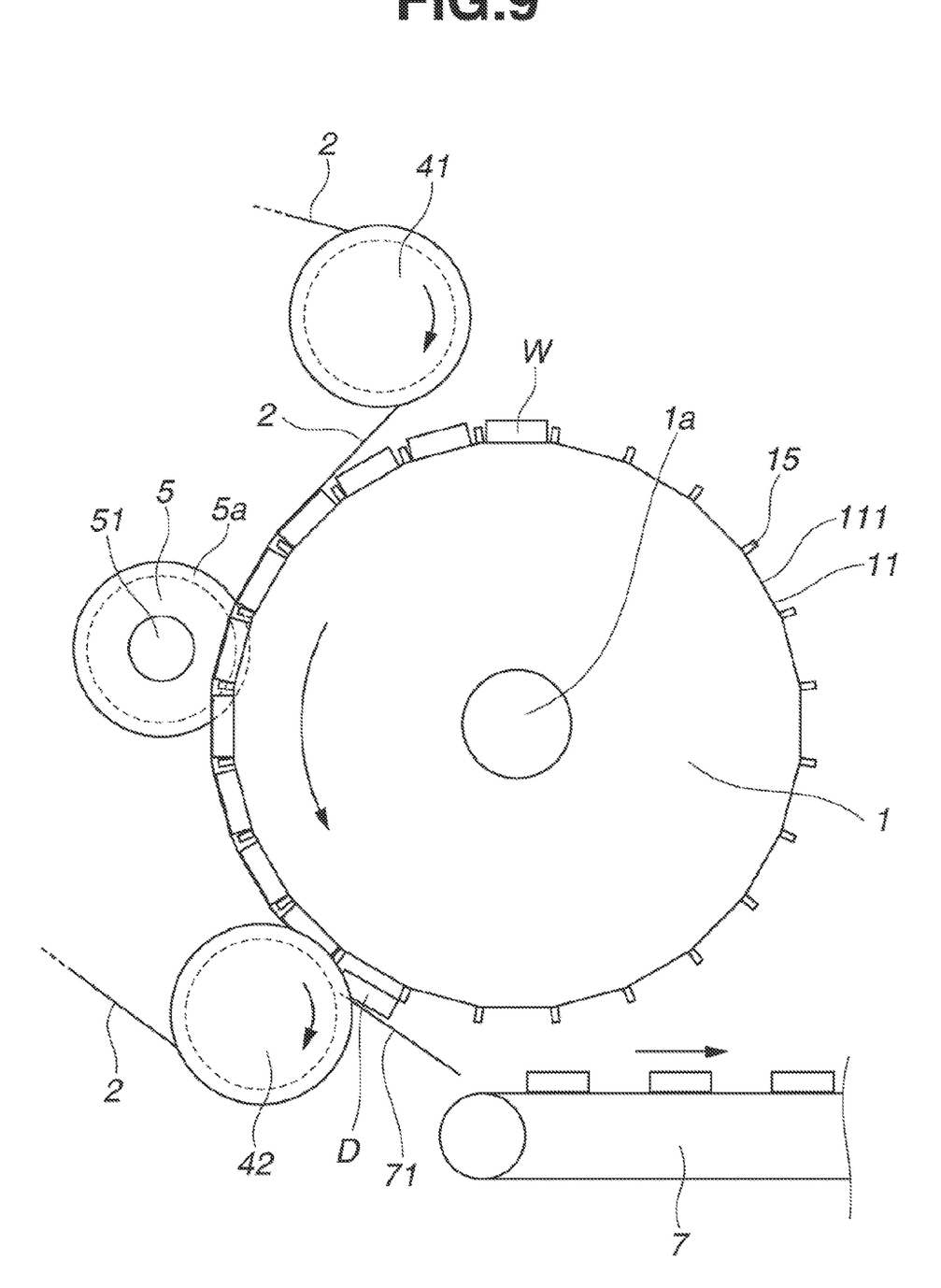
FIG. 9 is a side elevational view showing that the work is delivered, secured to the seat on the carrier by the belts, moved along with the belts, cut by the outer cutoff blade, and discharged out of the carrier.

FIG. 9 is a side view of the carrier in the cutoff machining apparatus of FIG. 1, showing that work W rested on seat 111 of carrier 1 is secured to seat 111 by elastic belt 2, carried forward (downward), cutoff machined by outer cutoff blade 5, and discharged below carrier 1. Once work W is delivered onto the peripheral surface (specifically seat 111) of work carrier 1 from an aft position in the rotational direction of carrier 1 with respect to first belt support 41, it is carried forward with rotation of carrier 1 (rotation of carrier 1 may be continuous or intermittent), moved past first belt support 41, and secured or clamped between carrier 1 and belt 2 by the pressing force of belt 2 in the range between first and second belt supports 41 and 42. Under the setting that the height of belt abutment 15 is lower than the height of work W, when two works W which are adjacent in the rotational direction of carrier 1 are in plane contact with elastic belt 2, belt 2 is spaced apart from belt abutment 15 between adjacent works W. This ensures that work W is tightly secured to seat 111 by belt 2. In the case of work W of rectangular shape, elastic belt 2 for securing work W is bent at forward and aft edges of work W in the rotational direction of carrier 1. The angle of bend (i.e., the angle of bent belt relative to the basis that the angle of straight belt is 0°) is preferably at least 1°, especially at least 3° and up to 60°, especially up to 30°. With this setting, the work W is more tightly secured.

Figure 10:
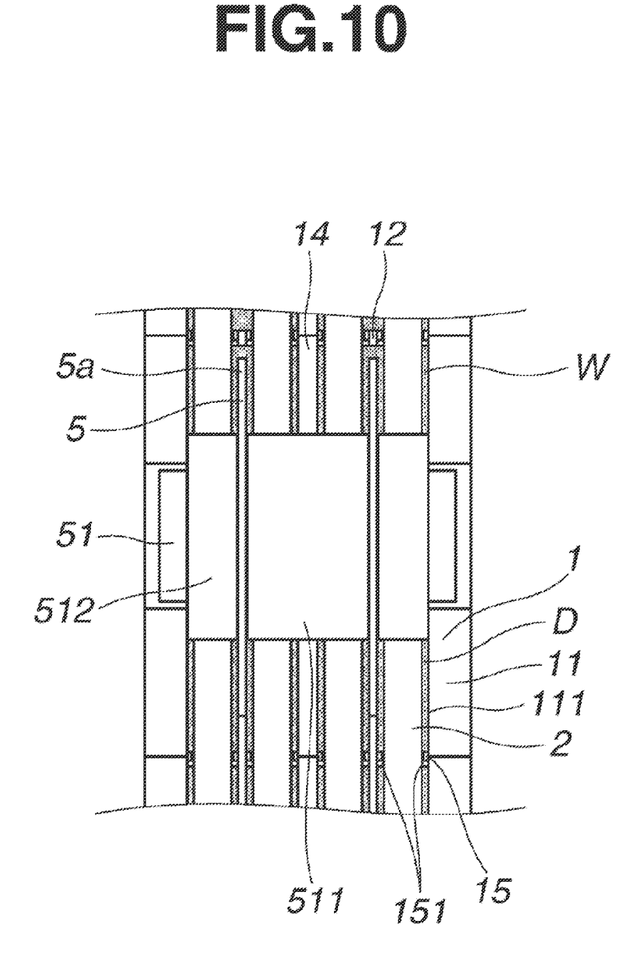
FIG. 10 is a side view of a portion of the work carrier, belt and outer cutoff blade in the apparatus of FIG. 1, showing that the work is cut off.

Next, the work W clamped between carrier 1 and elastic belt 2 is moved forward (or downward) in accordance with rotation of carrier 1. At an intermediate area between first and second belt supports 41 and 42, work W comes in contact with outer cutoff blade 5 which is inserted through the spacing between adjacent belts 2 (for securing work W) toward the peripheral surface of carrier 1, specifically outer edge (abrasive cutting edge) 5a of outer cutoff blade 5 which is inserted into groove 12 in the peripheral surface (seat 111) of carrier 1. While work W is moved further downward with rotation of carrier 1, work W in the secured state is cutoff machined by outer cutoff blade 5. By the rotating outer cutoff blade 5, one work W is divided into two pieces D. That is, two works W arranged in the rotating spindle direction of carrier 1 are divided into four pieces D in total. FIG. 10 is a partial side view for describing the machining action of the cutoff machining apparatus of FIG. 1, showing work W, carrier 1, elastic belts 2 and outer cutoff blades 5.

Next, the divided work (pieces) D yet secured between carrier 1 and belt 2 is moved forward with rotation of carrier 1, after which belt 2 is separated from divided work D in proximity to second belt support 42. The divided work D is released from the attachment by belt 2 and discharged at a forward position in the rotational direction of carrier 1 with respect to second belt support 42. The divided work D as discharged is released (falls down) from the peripheral surface (i.e., seat 111) of carrier 1 and transferred to chute 71. The divided work D slides down chute 71 under its own weight and reaches outlet conveyor 7. Thereafter divided work D is conveyed by outlet conveyor 7 from its inside end to its outside end.

As is evident from the above, the cutoff machining apparatus and method of the invention are designed such that the steps of delivering a work onto the peripheral surface of a work carrier, clamping the work between the carrier and an elastic belt and securing it to a seat on the carrier, moving the work forward, cutoff machining the secured work by an outer cutoff blade which is disposed forward in the moving direction, and detaching and discharging the divided work are continuously carried out in a serial flow in accordance with rotation of the carrier. The cutoff machining apparatus and method eliminate a need for attachment and detachment of sintered magnet to and from a jig and a need for mounting and dismounting of the jig to and from a sawing machine, as required in the prior art, and are successful in cutoff machining a sintered magnet at a high productivity and high accuracy while reducing the standby time of the apparatus.

Japanese Patent Application No. 2017-104336 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A sintered magnet cutoff machining apparatus comprising:
   a cylindrical or columnar work carrier mounted on a horizontal spindle and having a generally regular polygonal shape in a cross section perpendicular to the horizontal spindle, with the proviso that the polygon has 3 to 180 sides,
   a plurality of endless elastic belts which are extended along a portion of a peripheral surface of the work carrier, adapted to force a work of sintered magnet against the peripheral surface of the work carrier to secure the work, and adapted to travel synchronously with and counter to a rotation of the work carrier in a circulatory manner, at least two belt supports for supporting the belts in tension and adapted to change the traveling direction of the belts during their circulatory travel, a belt expanding mechanism comprising a belt expanding member configured to pull the endless elastic belts out of their track or push the belts inside their track between two belt supports of the at least two belt supports for tensioning the belts, an outer cutoff blade having a circumferential edge, mounted on a horizontal rotating shaft and adapted to move toward the work carrier such that the circumferential edge is moved to the peripheral surface of the work carrier, and work seats formed on respective sides of the peripheral surface of the polygonal work carrier and arranged in a rotational direction of the work carrier, the plurality of elastic belts being extended such that the work resting on each of the work seats is secured thereto by at least two elastic belts which are juxtaposed with a spacing therebetween, the at least two belt supports including a first belt support disposed above the spindle of the work carrier and adjacent to a portion of the peripheral surface of the work carrier which extends from a top of the work carrier to a forward position in the rotational direction of the work carrier, and a second belt support disposed below the spindle of the work carrier and adjacent to a portion of the peripheral surface of the work carrier which extends from a bottom of the work carrier to an aft position in the rotational direction of the work carrier, wherein the sintered magnet cutoff machining apparatus is configured such that:

the work is delivered onto the peripheral surface of the work carrier from an aft position in the rotational direction of the work carrier with respect to the first belt support, and secured to the seat by the elastic belts between the first and second belt supports in accordance with rotation of the work carrier;

the work is moved forward in accordance with rotation of the work carrier and cutoff machined by the outer cutoff blade which is inserted through the spacing between adjacent two elastic belts of the at least two elastic belts toward the peripheral surface of the work carrier; and a divided work is moved further forward in accordance with rotation of the work carrier, released from the seat, and discharged from the work carrier at a forward position in the rotational direction of the work carrier with respect to the second belt support such that each work is continuously secured to the seat during and after the cutoff machining of the work until the divided work reaches the forward position.

2. The cutoff machining apparatus of claim 1, further comprising a nozzle for supplying a coolant to a site where the work is cutoff machined by the outer cutoff blade.

3. The cutoff machining apparatus of claim 1 wherein each of the work seats on the respective sides of the peripheral surface of the polygonal work carrier is divided into a plurality of seat segments in a spindle direction of the work carrier.

4. The cutoff machining apparatus of claim 1 wherein the outer cutoff blade takes the form of a multiple blade assembly having a plurality of outer cutoff blades mounted on the rotating shaft with a spacer interposed between the blades.

5. The cutoff machining apparatus of claim 1 wherein the peripheral surface of the work carrier is provided with a groove in the rotational direction of the work carrier, the groove accepting entry of the circumferential edge of the outer cutoff blade.

6. The cutoff machining apparatus of claim 1 wherein each of the work seats is provided with at least one groove connecting opposite ends of the work seat in a spindle direction of the work carrier.

7. The cutoff machining apparatus of claim 1 wherein belt abutments are formed, in line with each belt, at edges between sides of the peripheral surface of the polygonal work carrier for restraining the belt from shifting in a spindle direction of the work carrier, the belt abutments having a height lower than a height of the work which is secured to the seat.

8. The cutoff machining apparatus of claim 7 wherein the belt abutment projects radially outward from the edges between sides of the peripheral surface of the polygonal work carrier.

9. The cutoff machining apparatus of claim 1 wherein the at least two belt supports further include third and fourth belt supports which are disposed outside the area where the belts overlap the peripheral surface of the work carrier, for keeping the elastic belts in tension and changing a traveling direction of the belts during their circulatory travel.

10. The cutoff machining apparatus of claim 9 wherein the belt expanding member of the belt expanding mechanism is constructed such as to pull the endless elastic belts out of their track or push the belts inside their track between the third and fourth belt supports for tensioning the belts.

11. The cutoff machining apparatus of claim 1, further comprising an inlet conveyor disposed in a location adjacent to an area where the work is delivered onto the peripheral surface of the work carrier, for conveying the work to the area.

12. The cutoff machining apparatus of claim 1, further comprising a guide disposed in an area where the work is delivered onto the peripheral surface of the work carrier, for resting the work in place on the seat.

13. The cutoff machining apparatus of claim 1, further comprising an outlet conveyor disposed in a location adjacent to an area where the divided work is discharged from the seat on the work carrier for conveying the divided work out of the area.

14. The cutoff machining apparatus of claim 1 wherein the cylindrical or columnar work carrier has a generally regular polygonal shape in a cross section perpendicular to the horizontal spindle, with the proviso that the polygon has 6 to 180 sides.

15. A method for cutoff machining a sintered magnet by means of a cutoff machining apparatus, said cutoff machining apparatus comprising a cylindrical or columnar work carrier mounted on a horizontal spindle and having a generally regular polygonal shape in a cross section perpendicular to the horizontal spindle, with the proviso that the polygon has 3 to 180 sides, a plurality of endless elastic belts which are extended along a portion of a peripheral surface of the work carrier, adapted to force a work of sintered magnet against the peripheral surface of the work carrier to secure the work, and adapted to travel synchronously with and counter to a rotation of the work carrier in a circulatory manner, at least two belt supports for supporting the belts in tension and adapted to change a traveling direction of the belts during their circulatory travel,
a belt expanding mechanism comprising a belt expanding member configured to pull the endless elastic belts out of their track or push the belts inside their track between two belt supports of the at least two belt supports for tensioning the belts,
an outer cutoff blade having a circumferential edge, mounted on a horizontal rotating shaft and adapted to move toward the work carrier such that the circumferential edge is moved to the peripheral surface of the work carrier, and
work seats formed on respective sides of the peripheral surface of the polygonal work carrier and arranged in a rotational direction of the work carrier,
the plurality of elastic belts being extended such that the work resting on each of the work seats is secured thereto by at least two elastic belts which are juxtaposed with a spacing therebetween,
the at least two belt supports including a first belt support disposed above the spindle of the work carrier and adjacent to a portion of the peripheral surface of the work carrier which extends from a top of the work carrier to a forward position in the rotational direction of the work carrier, and a second belt support disposed below the spindle of the work carrier and adjacent to a portion of the peripheral surface of the work carrier which extends from a bottom of the work carrier to an aft position in the rotational direction of the work carrier,
said method comprising the steps of:
delivering the work onto the peripheral surface of the work carrier from an aft position in the rotational direction of the work carrier with respect to the first belt support, and securing the work to the seat by the elastic belts between the first and second belt supports in accordance with rotation of the work carrier,
moving the work forward in accordance with rotation of the work carrier and inserting the outer cutoff blade through the spacing between adjacent two elastic belts of the at least two elastic belts toward the peripheral surface of the work carrier, for thereby cutoff machining the work,
moving a divided work further forward in accordance with rotation of the work carrier, releasing it from the seat, and discharging it from the work carrier at a forward position in the rotational direction of the work carrier with respect to the second belt support in such a manner that each work is continuously secured to the seat during and after the cutoff machining of the work until the divided work reaches the forward position.

16. The method of claim 15 wherein the cylindrical or columnar work carrier has a generally regular polygonal shape in a cross section perpendicular to the horizontal spindle, with the proviso that the polygon has 6 to 180 sides.

17. A sintered magnet cutoff machining system comprising:
a sintered magnet cutoff machining apparatus; and
a work of sintered magnet to be machined by the sintered magnet cutoff machining apparatus,
the sintered magnet cutoff machining apparatus comprising,
a cylindrical or columnar work carrier mounted on a horizontal spindle and having a generally regular polygonal shape in a cross section perpendicular to the horizontal spindle, with the proviso that the polygon has 3 to 180 sides,
a plurality of endless elastic belts which are extended along a portion of a peripheral surface of the work carrier, adapted to force the work against the peripheral surface of the work carrier to secure the work, and adapted to travel synchronously with and counter to a rotation of the work carrier in a circulatory manner,
at least two belt supports for supporting the belts in tension and adapted to change the traveling direction of the belts during their circulatory travel,
a belt expanding mechanism comprising a belt expanding member configured to pull the endless elastic belts out of their track or push the belts inside their track between two belt supports of the at least two belt supports for tensioning the belts,
an outer cutoff blade having a circumferential edge, mounted on a horizontal rotating shaft and adapted to move toward the work carrier such that the circumferential edge is moved to the peripheral surface of the work carrier, and
work seats formed on respective sides of the peripheral surface of the polygonal work carrier and arranged in a rotational direction of the work carrier,
the plurality of elastic belts being extended such that the work resting on each of the work seats is secured thereto by at least two elastic belts which are juxtaposed with a spacing therebetween,
the at least two belt supports including a first belt support disposed above the spindle of the work carrier and adjacent to a portion of the peripheral surface of the work carrier which extends from a top of the work carrier to a forward position in the rotational direction of the work carrier, and a second belt support disposed below the spindle of the work carrier and in-adjacent to a portion of the peripheral surface of the work carrier which extends from a bottom of the work carrier to an aft position in the rotational direction of the work carrier,
wherein the sintered magnet cutoff machining apparatus is configured such that:
the work is delivered onto the peripheral surface of the work carrier from an aft position in the rotational direction of the work carrier with respect to the first belt support, and secured to the seat by the elastic belts between the first and second belt supports in accordance with rotation of the work carrier;
the work is moved forward in accordance with rotation of the work carrier and cutoff machined by the outer cutoff blade which is inserted through the spacing between adjacent two elastic belts of the at least two elastic belts toward the peripheral surface of the work carrier; and
a divided work is moved further forward in accordance with rotation of the work carrier, released from the seat, and discharged from the work carrier at a forward position in the rotational direction of the work carrier with respect to the second belt support.

\* \* \* \* \*